United States Patent [19]

Hershey et al.

[11] Patent Number: 5,568,509
[45] Date of Patent: * Oct. 22, 1996

[54] DYNAMIC CODE DIVISION MULTIPLE ACCESS COMMUNICATION SYSTEM

[75] Inventors: John E. Hershey, Ballston Lake, N.Y.; Amer A. Hassan, Cary, N.C.; Gary J. Saulnier, Rexford, N.Y.

[73] Assignee: General Electric Company, Schenectady, N.Y.

[ * ] Notice: The term of this patent shall not extend beyond the expiration date of Pat. No. 5,563,906.

[21] Appl. No.: 407,552

[22] Filed: Mar. 20, 1995

[51] Int. Cl.⁶ .............................. H04B 1/69; H04B 7/12
[52] U.S. Cl. ..................... 375/200; 375/267; 375/299; 455/59
[58] Field of Search .................... 375/200, 206, 375/267, 299; 455/59, 101; 380/12, 34

[56] References Cited

U.S. PATENT DOCUMENTS

| | | | |
|---|---|---|---|
| 3,158,864 | 11/1964 | Lehan | 380/34 |
| 4,628,517 | 12/1986 | Schwarz et al. | 375/299 |
| 5,034,997 | 7/1991 | Iwasaki | 455/101 |
| 5,422,952 | 6/1995 | Kennedy et al. | 380/34 |

FOREIGN PATENT DOCUMENTS 1173607  12/1969  United Kingdom .

OTHER PUBLICATIONS

U.S. patent application entitled "Method of Geometric Harmonic Modulation (GHM)", (Attorney Docket No. RD–23786), J. E. Hershey, G. J. Saulnier, A. A. Hassan.
U.S. patent application entitled "Geometric Harmonic Modulation (GHM)–Digital Implementation,", (Attorney Docket No. RD–24194), J. E. Hershey, G. J. Saulnier, A. A. Hassan.
U.S. patent application entitled "Geometric Harmonic Modulation (GHM) for Combined Analog/Digital Transmissions", (Attorney Docket No. RD–24195) J. E. Hershey, G. J. Saulnier, A. A. Hassan.
U.S. patent application entitled "Correction of Multipath Distortion in Wideband Carrier Signals", (Attorney Docket No. RD–24196), J. E. Hershey, G. J. Saulnier.
U.S. patent application entitled "Geometric Harmonic Modulation (GHM)–Analog Implementation", (Attorney Docket No. RD–24203), J. E. Hershey, G. J. Saulnier, A. A. Hassan.
U.S. patent application entitled "Interlaced Geometric Harmonic Modulation", (Attorney Docket No. RD–24223), J. E. Hershey.

*Primary Examiner*—Stephen Chin
*Assistant Examiner*—Jeffrey W. Gluck
*Attorney, Agent, or Firm*—Lawrence P. Zale; Marvin Snyder

[57] ABSTRACT

A traffic carrier waveform $W_n(\Phi,R;t)$ being the product of a number of tones is employed in transmitting blocks of information from a transmit unit to a receive unit. The tones are geometrically increasing multiples of a frequency of a fundamental tone. Each tone incorporates a tone phase. The selection of these tone phases uniquely identifies each transmitted signal. The tone phases also is used as a 'key' in converting a message signal into a direct wide spectrum signal for communication. To insure that third parties do not decode the transmitted message, the tone phases are transformed to seed phases by a method known to both the transmit and receive units, but not to third parties. The seed phases are then transmitted by intermittent preamble carrier waveform to the receive unit which transforms these into the tone phases and decodes the message signal. The seed phases may be dynamically changed according to a sequence known or generated by both the transmit unit and receive unit. In another embodiment, the tone phases may also be prestored in both the transmit and receive unit, and there is no need to calculate and transmit seed phases.

3 Claims, 2 Drawing Sheets

DYNAMIC CODE DIVISION MULTIPLE ACCESS COMMUNICATION SYSTEM

CROSS REFERENCES TO RELATED APPLICATIONS

This application is related to U.S. patent applications "Method Of Geometric Harmonic Modulation (GHM)" Ser. No. 08/407,560, "Geometric Harmonic Modulation (GHM)—Analog Implementation" Ser. No. 08/407,088, "Geometric Harmonic Modulation (GHM) For Combined Analog/Digital Transmissions" Ser. No. 08/407,555, "Geometric Harmonic Modulation (GHM)—Digital Implementation", Ser. No. 08/407,554 by Hershey, Saulnier, Hassan; "Correction Of Multipath Distortion In Wideband Carrier Signals", Ser. No. 08/407,589 by Hershey, Saulnier; and "Interlaced Geometric Harmonic Modulation", Ser. No. 08/407,551 by John Hershey all filed Mar. 20, 1995, assigned to the present assignee and hereby incorporated by reference.

BACKGROUND OF THE INVENTION

1. Field of the Invention

This invention relates to electronic signal modulation, and more specifically, to dynamic wide spectrum modulation.

2. Description of Related Art

Many systems provide for a plurality of transmitter and receiver pairs, "communicating pairs", to communicate simultaneously with little or no interference between communicating pairs. This may be accomplished by allocating a different communication frequency to each communicating pair, known as frequency division multiple access (FDMA). There are situations in which it is difficult or impossible to assign each communicating pair a unique frequency. This occurs when there are simply too many communicating pairs close to each other on a designated bandwidth.

Another access method, such as time division multiple access (TDMA), may be employed, wherein each communicating unit is assigned a "time slice" in which to communicate on the same frequency band. This causes the "time slices" to become shorter as the number of communicating pairs increases.

Since both FDMA and TDMA communicate on narrowly defined bands, they are both susceptible to narrowband interference. Another method employs a spreading each message from each communicating pair across the entire usable bandwidth. They are all specially encoded such that they may be separated at the receiver. These are known as wide spectrum techniques.

Wide spectrum techniques are those modulation techniques which require a transmission bandwidth that far exceeds the message information bandwidth. The wide spectrum modulation characteristics should not depend upon the individual message to be transmitted as is the case with some other wideband modulation schemes such as wideband FM. There are many wide spectrum mechanisms. They can be conveniently classified as: (i) direct sequence, (ii) frequency hopping, (iii) time hopping, and (iv) hybrids.

In direct sequence wide spectrum modulation, a wideband carrier signal is combined with the relatively narrowband message to yield an encoded wideband signal. A typical digital implementation would be to create a high speed random binary sequence in having an equal probability of being a one or zero at any particular time. This high speed binary sequence is added to a binary message sequence. The addition is typically done by exclusive-ORing ("XOR") the two sequences together. The bits of the message sequence are much longer in duration than the bits from the high speed random source and thus many random bits are used per information bit. The random bits are often referred to as "chips" and the relationship between the random sequence rate and the message rate is such that an integral number of chips are used per message bit. The code used to "spread" the signal at the transmit unit, is required in "despreading" the signal at the receive unit.

There are many uses for direct sequence wide spectrum techniques. One primary use is that of spectrum sharing. It is possible for a number of different communicating pairs to occupy the same bandwidth simultaneously without significant mutual interference. This is usually accomplished in direct sequence wide spectrum systems by assigning each communicating pair a different spectrum spreading code. This is known in the art as code division multiple access (CDMA).

Another use of wide spectrum techniques is to transmit messages, which appear as noise to a listener who is not intended to receive the signal.

Since the messages are spread over a large bandwidth, there is less possibility of loss of communications due to narrow bandwidth interference. The power of the interference is divided by the bandwidth over which it is applied.

Another use of wide spectrum communication is that of sending messages which cannot be interpreted by a third party. The method of expanding the spectrum of the signal at the receiver must be employed at the receiving unit to recover the original message. A third party which does not have prior knowledge of the method used at the transmit unit, cannot easily recover the transmitted message.

Typically, one problem with direct sequence wide spectrum communications and CDMA is synchronization. In order to function properly, the receiver must generate a signal from the spreading code which is the inverse from the transmitted wide spectrum signal, and do so at the same rate as the transmit unit. The receive unit must also correct relative phase discrepancies between the transmit and receive unit. This requires synchronization to be established and maintained at a tolerance finer than a single chip width. Further, the receiver must know the particular spreading code employed by the transmit unit in order to decode the signal and recover the message.

Currently there is a need for a simplified direct wide spectrum modulation system which is not as sensitive as convention systems to synchronization, and transmits its message to only the intended receive unit.

SUMMARY OF INVENTION

A digital implementation of geometric harmonic modulation (GHM) system communicates a message signal only to an intended receive unit.

Tone phases and magnitudes ($\phi_i^P, M_i^P$) defining a 'key' used in spreading and despreading a message signal are selected. These are employed in determining traffic phases and magnitudes ($\phi_j', M_j'$) defining a traffic carrier waveform.

The tone phases and magnitudes are transformed by a transmit calculation unit into 'seed phases and magnitudes' defining a preamble carrier waveform and stored in a storage device. A digital modulation unit coupled to the storage device, operates in a preamble mode producing a preamble carrier signal from the seed phases and magnitudes. It also operates in a traffic mode producing a traffic carrier signal $W_n(\Phi,R;t)$ from the traffic phases and magnitudes.

A binary encoder encodes the binary message intended to be transmitted in the traffic carrier waveform during the traffic mode to produce a digitally encoded spread spectrum signal for transmission through a channel.

At the receive unit, the seed phases are extracted during the preamble mode. These seed phases and magnitudes are transformed in a manner complementary to that of the transmit unit to result in tone phases and magnitudes. A reference carrier traffic waveform $W_n(\Phi,R;t)$ is constructed from the tone phases and magnitudes and compared with the received signal. The comparison produces either a correlation of approximately 1 or −1, meaning that the signal matches, and is inverted, respectively. This comparison is converted on a bit by bit basis into the transmitted binary message.

The present invention may employ many different sets of phases for the traffic carrier waveform, provided that both the transmit and receive unit know the sets of phases, or can construct the appropriate phase from the seed phases.

Employing a fundamental seed tone having a phase of zero allows the receive unit to lock onto this tone and determine synchronization.

The present invention is particularly applicable to spread spectrum code division multiple access (CDMA) communication. Many communicating transmit/receive pairs may occupy the same bandwidth simultaneously with little interference. The amount of interference increases smoothly as the number of communicating pairs increases. There is little overhead organization required, as compared with time division multiple access (TDMA), and there is also no need to have the receive unit know the despreading code in advance. There is also flexibility in using the 'address' to apply to multiple receive units, to different message types, or to identify the originating transmit unit.

OBJECTS OF THE INVENTION

An object of the present invention is to provide a simplified method of direct wide spectrum modulation and demodulation of an electronic signal to only an intended receive unit for communication purposes.

Another object of the present invention is to provide a system for wide spectrum communication which is less sensitive to synchronization errors than conventional systems.

Another object of the present invention is to provide a wide spectrum communications which uses less complex equipment compared with conventional systems.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

DETAILED DESCRIPTION OF THE PREFERRED EMBODIMENT

Consider that the system supports a number of simultaneous users. Each user of the system signals one bit per symbol time defined as the reciprocal of the signaling rate R. The signaling waveform is a member of $\{W_n(\Phi,R;t)\}$ where $$W_n(\Phi,R;t) = \prod_{i=0}^{n} \sin(2^i \cdot 2\pi R t + \phi_i) \quad (1)$$

where n is the "order" of the function, $\Phi=(\phi_0,\phi_1,\ldots \phi_n)$, and $$\phi_i \in \left\{ 0, -\frac{\pi}{2} \right\}.$$

For finite order, n, the functions and all of their derivatives are continuous in the interval $$\left( 0, \frac{1}{R} \right).$$

Figure 1A:
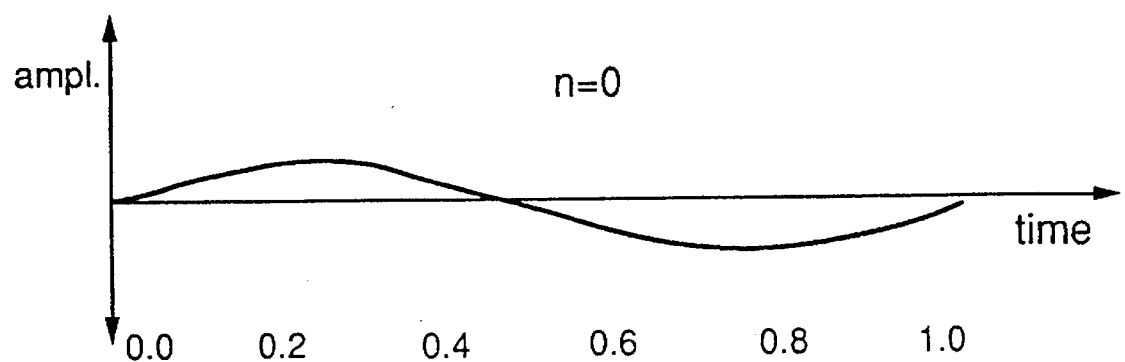
FIGS. 1a, 1b, 1c are graphs of the wave function $W_n(0,1;t)$ for n=0,3,6, respectively, used in connections with explaining the present invention.
Figure 1B:
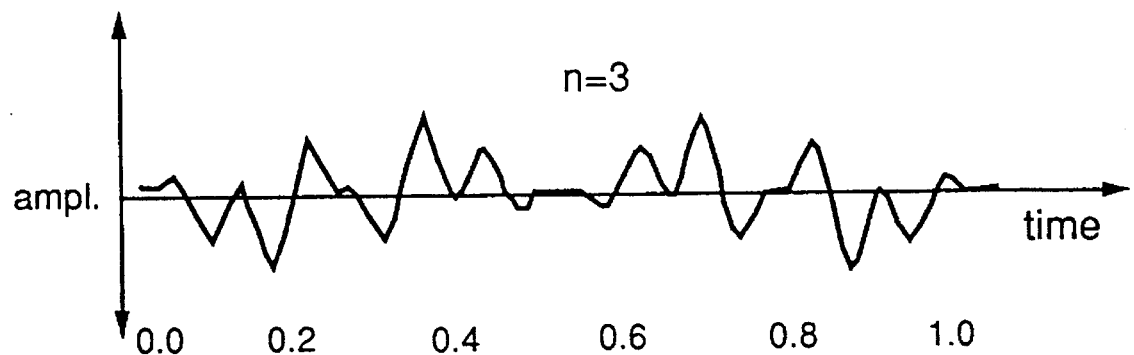
Figure 1C:
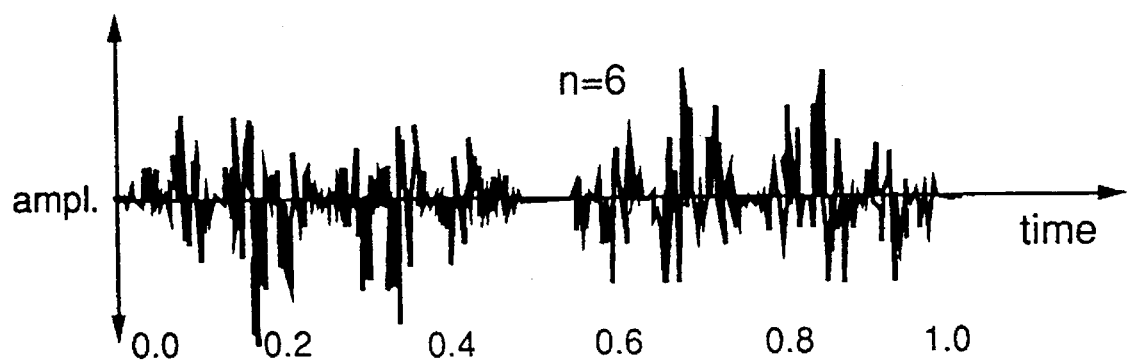

FIGS. 1a, 1b, 1c illustrate representative waveforms of $$2^{\frac{n+1}{2}} W_n(\Phi,1;t),$$

namely $W_0(0,1;t)$, $W_3(0,1;t)$ and $W_6(0,1;t)$, respectively, where 0 indicates that all of the phases $\phi_i$ are zero. (For these examples, R=1).

If $\{b^{(i)}(m)\}$ is the binary message sent by the i-th user, the i-th user signal can be expressed as $s^{(i)}(t)=b^{(i)}(m)W_n(\Phi,R;\zeta^{(i)})\delta([\zeta^{(i)}])$ where $\zeta^{(i)}=R(t-\tau^{(i)})-m$, $\tau^{(i)}$ is the time of the start of the i-th transmission, [.] is the greatest integer function, and where $\delta(.)$ is the Kronecker delta function.

The composite signal, S(t), is then:

$$S(t) = \sum_{i=1}^{N} b^{(i)}(m)W_n(\Phi,R;\xi^{(i)})\delta([\xi^{(i)}]). \quad (2)$$

where N is the number of users.
By writing $$\sin(2^i \cdot 2\pi R t + \phi_i) = \quad (3)$$

$$\frac{1}{2j}[\exp(j\{2^i \cdot 2\pi R t + \phi_i\}) - \exp(-j\{2^i \cdot 2\pi R t + \phi_i\})]$$

it is easily seen that Equation (1) can be expanded into a sum as $$W_n(\Phi,R;t) = \quad (4)$$

$$2^{-n} \sum_{k=1,3,5\ldots}^{2^{n+1}-1} \Theta\left(\frac{k-1}{2}\right) \begin{cases} (-1)^{n/2}\sin(k \cdot 2\pi R t + A \cdot \Phi) \\ \text{for } n \text{ even} \\ (-1)^{(n-1)/2}\cos(k \cdot 2\pi R t + A \cdot \Phi) \\ \text{for } n \text{ odd} \end{cases}$$

where
$A=(\alpha_0,\alpha_1,\ldots \alpha_n)$ is a binary representation of the summation index k with:

$$\alpha_i = (\pm 1) \text{ and } k = \sum_{i=0}^{n} \alpha_i \cdot 2^i,$$

$$\Phi = (\phi_0, \phi_1, \ldots \phi_n),$$

$$A \cdot \Phi = \sum_{i=0}^{n} \alpha_i \phi_i,$$

$\Theta(k)$, k=0,1,2, ... is the Thue-Morse sequence. The Thue-Morse sequence can be thought of the diagonal elements in the infinite Cartesian product $$\lim_{n \to \infty} H_n$$

where $H_n = H_{n-1} \otimes H_1$ and $$H_1 = \begin{pmatrix} 1 & 1 \\ 1 & -1 \end{pmatrix}.$$

(The first eight values, $\Theta(0)$–$\Theta(7)$, are (1,−1,−1,1,−1,1,1,−1).

When a message is to be sent, the transmit unit enters the synchronization or preamble mode. For an environment wherein there is negligible multipath, the transmit unit transmits a preamble signal for a series of cycles. A cycle is defined as the duration of time delimited by two successive negative to positive zero crossings of the lowest frequency of the preamble signal.

A frequency of a master sinusoidal signal, or tone is selected. The master tone is divided down to produce frequencies of a plurality of tones, the lowest tone being a fundamental tone. Alternatively, a fundamental sinusoidal signal, or tone, having a fundamental frequency $2\pi f_0$ is selected. A plurality of tones having frequencies which are geometrically progressing multiples of a fundamental frequency, $2\pi f_0$ to result in n+1 tones.

Phases $\Phi = \{\phi_i, i=1, 2, 3, \ldots n\}$ for each of the tones, except for the fundamental tone which has a phase of zero, are selected. The tone phases $\Phi$ in a preferred embodiment, are either of two substantially separated values, such as 0 and $-\pi/2$ radians, which may be selectable by an operator. Tone phases $\Phi$ are used as a 'key' for spreading an input signal across a frequency spectrum, and for despreading the signal at a receive unit.

In order to insure that third parties do not decode the transmitted message, tone phases $\Phi$ are transformed into one or more sets of 'seed phases' $\Psi$, which are transmitted to the receive unit, then transformed back to tone phases $\Phi$ to decode the message. The method of transforming, may be any conventional method, provided that the method is known at the receive unit for obtaining the tone phases $\Phi$ from the seed phases $\Psi$. The tone phases $\delta$ may be dynamically changed from bit to bit. The dynamics of the change may be a stored random sequence, or a scheme generated at both the transmit unit and the receive unit.

A preamble carrier waveform is constructed by summing the tones, each incorporating its seed phase. The preamble carrier waveform has the full transmit power distributed over the n+1 frequencies.

The seed phases $\Phi$ are also used as an operator selectable 'address' of an attached message. In one possible embodiment, each receive unit knows its own 'address'. The receive unit constantly monitors preamble signals to identify the phase 'address'. If it encounters an 'address' which matches its own, it then despreads and decodes the appended message sent during the traffic mode using its 'address'.

In an alternative embodiment, the seed phases $\Phi$ define a transmit unit ID. Each receive unit knows which transmit unit to 'pay attention to' at a given point in time. If the phase 'address' matches a transmit unit which the receive unit is supposed to listen to, it despreads and decodes this appended message during the traffic mode.

In still another embodiment, the seed phase 'address' is used to identify message types. Each receive unit knows which message type to monitor in a given situation. For example, a 'broadcast' message type 'address' will be received by all receive units, with a 'group 2' message type being despread and decoded by receive units which are presently designated as 'group 2' receive units, while other receive unit presently designated as 'group 1' or 'group 3' will ignore the message.

After completion of the preamble mode, the present invention enters the signaling, or traffic, mode. A traffic carrier waveform is employed which is a product of the tones each employing its tone offset as defined above.

Figure 2:
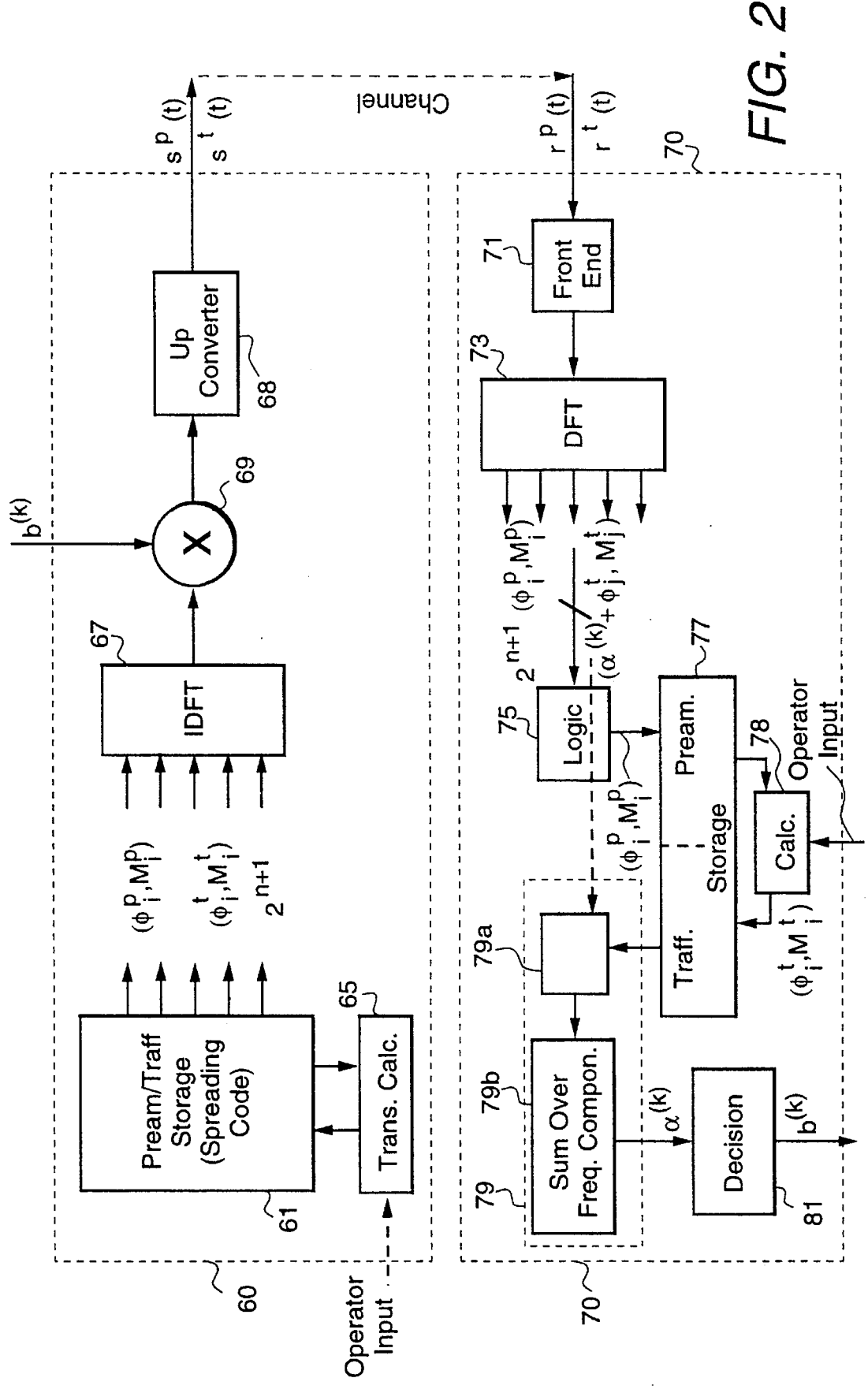
FIG. 2 is a simplified block diagram of a digital embodiment of a communications system according to the present invention.

As shown in FIG. 2, after transmit unit 60 enters the traffic mode, IDFT 67 creates $2^n = 2^5 = 32$ tones, with each tone having a phase, for n selected to be 5.

The seed phases $\Psi$ are acquired from the received signal during the preamble mode. If the phases $\Phi$ correspond to an 'address' which receive unit 70 is searching for, they are transformed in a manner complementary to the transformation in the transmit unit to produce tone phases $\Phi$, which are stored for later despreading. A message immediately following the preamble signal is despread and decoded using the tone phases $\Phi$ acquired during the preamble mode.

Since all tones employed by the present invention may be derived from a fundamental tone, by selecting a seed phase of zero for the fundamental tone, the receive unit may 'lock onto' the fundamental tone, and synchronization would be much simpler than conventional direct wide spectrum systems.

Also, the implementation described above is a very simple circuit. This circuit may be miniaturized and employed in small areas which conventional direct wide spectrum devices would not be able to be employed.

In FIG. 2, a digital implementation according to the present invention is shown. A fundamental tone is selected. A set of n tones is then selected, preferably having frequencies being geometrically increasing multiples of the fundamental tone, $2^i * 2\pi f_0$ i=0,1,2 ... n, where $2\pi f_0$ is the frequency of the fundamental tone. These may be calculated from the fundamental tone. The magnitude $M^P$ of all frequencies, except for the n+1 tones selected to be employed in the preamble mode, will be set to zero. All non-zero magnitudes $M^P$ are set to an equal value.

A set of tone phases, $\Phi^P = \{\phi_0^P, \phi_1^P, \phi_2^P, \ldots \phi_{n+1}^P\}$, to be used as an 'address', and a spreading code, may be provided by operator input for each tone.

A transmit calculation unit 65 transforms tone phases and magnitudes into seed tones and magnitudes by any method provided the seed phase and magnitudes are not substantially the same as the tone phases and magnitudes. A complementary method of converting the seed phases and magnitudes back into tone phases and magnitudes should be known or prestored in the receive unit 70. The seed phase and magnitude pairs $(\phi_i^P, M_i^P)$ for each tone are prestored in a memory device 61.

The seed phases and magnitudes $(\phi_i^P, M_i^P)$ are provided to an inverse discrete Fourier transform (IDFT) unit 67 during the preamble mode.

IDFT 67 creates time-varying preamble carrier waveform from the seed magnitudes and phases $(\phi_i^P, M_i^P)$ provided to it, which is the sum of the individual tones employing the seed phases.

The signal resulting from multiplier 69 is upconverted by an up converter 68 to a signal $s^P(t)$ which is transmitted through a channel to receive units 70.

In receive unit 70, the signal received during the preamble mode $r^P(t)$ is downconverted to baseband signal by a front end 71 and then passed to a discrete Fourier transform (DFT) unit 73 which determines n+1 phases and magnitudes $(\phi_i^P,$ $M_i^P$) for the n+1 preamble tones. A logic unit 75 determines if the seed phases $\Psi$ match an 'address' which it is to monitor. The 'address' is previously stored in a storage unit 77. If there is a match, the message is one to be despread and decoded during a 'traffic' mode.

A receive unit calculation unit 78 transforms seed phases and magnitudes into tone phases and magnitudes, and stores them in storage device 77.

During the traffic mode, transmit calculation unit 65 receives the tone phases and magnitudes ($\phi_i^P, M_i^P$) and calculates the traffic phases, and magnitudes ($\phi_j^t, M_j^t$) of $2^n$ tones to be employed in the traffic mode. One such method of calculating the phases and magnitudes ($\phi_j^t, M_j^t$) is to determine traffic carrier waveform $W_n(\Phi, R; t)$ from the tone phases according to Eqs. (1) and (4) above. A discrete Fourier Transform is then performed on samples of this waveform. The resultant traffic phases and magnitudes ($\phi_j^t, M_j^t$) are stored by transmit calculation unit 65 in storage 61.

The $2^n$ traffic phases and magnitudes ($\phi_j^t, M_j^t$) from storage device 61 are provided to IDFF unit 67. IDFT unit 67 creates a traffic carrier waveform $W_n(\Phi, R; t)$, having $2^n$ tones, being the product of the n+1 preamble tones each employing their corresponding 'key' or phase.

The traffic carrier waveform $W_n(\Phi, R; t)$ is passed to a multiplier 69, along with a binary stream $b^{(k)}$ desired to be transmitted. Binary stream $b^{(k)}$ has been previously converted into a series of values of 1 and −1, representing a series of binary logical values. Multiplier 69 encodes the binary stream by either inverting complex carrier signal $W_n(\Phi, R; t)$ for a bit period, or leaving it unchanged, for a −1 and 1 value, respectively. Inverting the signal is also equivalent to shifting the carrier signal by a phase shift $\alpha = \pi$.

Multiplier 51 passes the encoded signal to up converter 68 to transmit the encoded traffic carrier signal through a channel to receive units 70.

Signal r'(t) is received by receive unit 70 directly after the preamble mode. Signal r'(t) is down converted by a front end 71. The down converted signal is sampled and fed to DFT unit 73. DFT unit 73 extracts traffic phases and magnitudes from each of the component sinusoids of the sampled signal. This results in $2^n+1$ tones, $2^n$ traffic phases and magnitudes ($\phi_j^t, M_j^t$), many of which are zero.

A logic unit 75 receives the $2^n+1$ traffic phases and magnitudes from the DFT and passes them to a dot product unit 79 for messages intended to decode.

Receive unit calculation unit 78 calculates traffic phases and magnitudes from tone phases and magnitudes stored in storage device 77 during the preamble mode.

Storage device 77 holds $2^n$ traffic phases and corresponding magnitudes ($\phi_j^t, M_j^t$) which were previously calculated and stored. These should be the same as those in storage device 61 in transmit unit 10.

In an alternative embodiment, a receive calculation unit 78 calculates a set of $2^n$ traffic phases, and corresponding magnitudes ($\phi_j^t, M_j^t$) from the n+1 preamble phases and magnitudes ($\phi_i^P, M_{iP}$) obtained during the preamble mode, as described above in reference to the transmit calculation unit 65. These traffic phases and magnitudes ($\phi_j^t, M_j^t$) are used as the despreading code.

Dot product unit 79 employs a correlation unit 79a that correlates the output of DFT unit 73, ($\alpha^{(k)} + \phi_j^t, M_j^t$), with the traffic phases and magnitudes ($\phi_j^t, M_j^t$) of storage device 77 to determine phases due to the binary signal $\alpha^{(k)}$.

The correlation result is then summed over all frequency components by a summer 79b to result in the dot product.

The dot product from dot product unit 79 is compared to a predetermined threshold to make a data bit decisions, resulting in binary message $b^{(k)}$ being the original binary information provided to transmit unit 60.

The receive unit need only know, or be able to calculate the tone phases to decode the message. If transmit unit 60 provides transformed tone phases as seed phases during the preamble mode to receive unit 70, the traffic carrier waveform may be changed dynamically. It is envisioned that a defined length of data, a block, be transmitted by a traffic carrier waveform constructed from a given set of tone phases. A preamble tone can be transmitted with seed phases indicating a new set of tone phases and a subsequent block of data can then be transmitted on a traffic carrier waveform having this set of phase tones.

In a further embodiment, there would be no need at all to indicate tone phases if both transmit unit 60 and receive unit 70 have these prestored in storage unit 61, 78, respectively. In this arrangement, the preamble carrier waveform will simply be the sum of tones all with a zero phase.

The present invention may be easily miniaturized since it may be constructed from small digital chips. It also directly produces spread spectrum carrier wave, resistant to interference at narrowband interference. It also allows code division multiple access (CDMA) requiring little or no overhead control.

While several presently preferred embodiments of the novel invention have been described in detail herein, many modifications and variations will now become apparent to those skilled in the art. It is, therefore, to be understood that the appended claims are intended to cover all such modifications and variations as fall within the true spirit of the invention.

What we claim is:

1. A method of communicating a message signal m(t) from a transmit unit to a receive unit without interference or reception by a third party comprising the steps of:

a) selecting a frequency of a fundamental tone;

b) selecting a plurality of tones having frequencies higher than the fundamental tone;

c) selecting a set of tone phases $\Phi = (\phi_0, \phi_1, \ldots \phi_n)$, where $\Phi_i$ is selected for each of the tones except the fundamental tone for which a phase $\phi_0 = 0$ is selected;

d) manipulating the set of tone phases $\Phi$ to result in a set of seed phases $\Psi$;

e) applying seed phases $\Psi$ to their corresponding tones to result in seed components;

f) summing the seed components to produce a preamble carrier waveform;

g) transmitting the preamble carrier waveform from said transmit unit to said receive unit;

h) applying tone phases $\Phi$ to their corresponding tones to result in traffic waveform components;

i) at said receive unit:
      1. extracting the seed phases $\Psi$ from the preamble carrier waveform at the receive unit;
      2. transforming the set of seed phases $\Psi$ to result in tone phases $\Phi$;

j) at said transmit unit:
      1. multiplying the traffic waveform components to create a traffic carrier waveform $W_n(\Phi, R; t)$;
      2. encoding a data block of a message signal m(t) into traffic carrier waveform $W_n(\Phi, R; t)$ to result in an encoded carrier waveform;
      3. transmitting the encoded carrier waveform from said transmit unit to said receive unit;

k) at said receive unit: despreading a portion of the encoded carrier waveform employing tone phases $\Phi$ as a despreading key to result in the data block.

2. The method of communicating a message signal m(t) of claim 1 further comprising the step of repeating steps "c" through "k" for a plurality of sets of phases Φ and data blocks.

3. A method of dynamic direct spread spectrum communication of a binary message signal from a transmit unit to a receive unit comprising the steps of:

a) producing a traffic carrier waveform described by:

$$W_n(\Phi, R; t) = \prod_{i=0}^{n} \sin(2^i \cdot 2\pi R t + \phi_i);$$

and where n is an "order" of the function, $\Phi = (\phi_0, \phi_1, \ldots \phi_n)$ is a tone phase set next in a predetermined sequence of tone phase sets known to both said transmit and receive units, t is time, and R is a rate at which said binary message is to be transmitted;

b) encoding a data block of said message signal m(t) in traffic carrier waveform to result in an encoded carrier waveform;

c) transmitting the encoded carrier waveform to said receive unit;

d) receiving the encoded carrier waveform at said receive unit;

e) synthesizing a reference carrier waveform $W_n(\Phi, R; t)$ at said receive unit from the predetermined tone phase set Φ;

f) correlating the synthesized waveform $W_n(\Phi, R; t)$ with the received encoded carrier waveform to result in message signal m(t); and g) repeating steps "a"–"f" for a plurality of tone phase sets Φ according to the predetermined sequence to result in a plurality of transmitted data blocks.

* * * * *